United States Patent

Gonda et al.

[11] Patent Number: 5,575,371
[45] Date of Patent: Nov. 19, 1996

[54] ELECTROMAGNETIC CLUTCH

[75] Inventors: Hideyuki Gonda; Masakatsu Sakaki; Yukimasa Nagai, all of Gunma, Japan

[73] Assignee: Sanden Corporation, Gunma, Japan

[21] Appl. No.: 469,599

[22] Filed: Jun. 6, 1995

Related U.S. Application Data

[63] Continuation of Ser. No. 358,313, Dec. 19, 1994.

[30] Foreign Application Priority Data

Dec. 21, 1993 [JP] Japan ................................. 5-321909

[51] Int. Cl.$^6$ ........................ F16D 27/112; F16D 27/14
[52] U.S. Cl. ........................ 192/84.96; 192/30 V
[58] Field of Search .................. 192/84 C, 30 V;
403/225, 227; 248/635

[56] References Cited

U.S. PATENT DOCUMENTS

| | | | |
|---|---|---|---|
| 1,952,115 | 3/1934 | Borst | 403/227 X |
| 2,258,067 | 10/1941 | Paton | 403/227 X |
| 2,467,548 | 4/1949 | Bradley | 403/227 |
| 2,879,090 | 3/1959 | Everitt et al. | 403/227 |
| 2,940,785 | 6/1960 | Haushalter | 403/227 X |
| 3,384,213 | 5/1968 | Bernard et al. | |
| 3,425,529 | 2/1969 | Hayashi | |
| 3,455,421 | 7/1969 | Miller | |
| 3,565,223 | 2/1971 | Pierce | |
| 3,774,739 | 11/1973 | Higuchi | |
| 4,187,939 | 2/1980 | Silvestrini et al. | |
| 4,243,128 | 1/1981 | Shirai | |
| 4,441,864 | 4/1984 | Watts et al. | |
| 4,493,407 | 1/1985 | Newton | |
| 4,602,176 | 7/1986 | Baker | |
| 4,619,351 | 10/1986 | Takatoshi | |
| 4,711,135 | 12/1987 | Horiuchi et al. | 248/635 X |
| 4,718,526 | 1/1988 | Koitabashi | |
| 4,808,870 | 2/1989 | Gonda | |
| 5,009,297 | 4/1991 | Gonda | 192/84 C |
| 5,046,594 | 9/1991 | Kakinuma | 192/84 C |

FOREIGN PATENT DOCUMENTS

| | | | |
|---|---|---|---|
| 621575 | 5/1927 | France | 248/635 |
| 53-34045 | 3/1978 | Japan | |
| 58-08997 | 2/1983 | Japan | |
| 58-72727 | 4/1983 | Japan | |
| 1180697 | 2/1970 | United Kingdom | |
| 2127913 | 4/1984 | United Kingdom | |

*Primary Examiner*—Rodney H. Bonck
*Attorney, Agent, or Firm*—Baker & Botts, L.L.P.

[57] ABSTRACT

An electromagnetic clutch includes a first rotatable member for connection to an external driving source and a second rotatable member for connection to a driven member. An annular magnetic member is connected to the second rotatable member through a plurality of leaf springs. A third rotatable member is connected to the second rotatable member to limit the axial movement of the annular magnetic member. A plurality of connecting and absorbing devices are fixedly disposed between the annular magnetic member and the third rotatable member. These devices absorb vibration and impact forces when the annular magnetic member is attracted to the first rotatable member. A device is provided for preventing the destruction of the connecting and absorbing device due to the impact force and vibration created upon engagement of the electromagnetic clutch.

3 Claims, 11 Drawing Sheets 5,575,371

ELECTROMAGNETIC CLUTCH

This application is a continuation, of U.S. patent application Ser. No. 08/358,313, filed Dec. 19, 1994.

BACKGROUND OF THE INVENTION

1. Field of the Invention

The invention relates to electromagnetic clutches and, more particularly, to an improved connecting structure between an armature plate and a stopper plate for reducing impact noise and vibration when the armature plate is attracted to a rotor.

2. Description of the Invention

Electromagnetic clutches are well known in the prior art and are often used for controlling the transfer of power to a compressor in an automobile air conditioning system. One such electromagnetic clutch is disclosed in U.S. Pat. No. 4,296,851 to Pierce. Such a conventional electromagnetic clutch is shown in FIGS. 1 and 2.

Referring to FIGS. 1 and 2, electromagnetic clutch assembly 10 selectively drivingly couples a refrigerant compressor in an automobile air conditioning system to a driving source. For purposes of explanation only, the right side of FIG. 2 will be referred to as the forward or front end, while the left side of FIG. 2 will be referred to as the rearward or rear end. Electromagnetic clutch assembly 10 includes clutch rotor 15, electromagnetic coil 20, housing 21 and bearing 16, which collectively generally constitute driving mechanism 100 of electromagnetic clutch assembly. Hub 24, leaf spring 27, stopper plate 28 and annular armature plate 26 generally constitute driven mechanism 201 (FIG. 1) of the electromagnetic clutch assembly.

Electromagnetic clutch 10 is fixedly coupled to compressor housing 11, which is provided with tubular extension 12 surrounding compressor drive shaft 13. Drive shaft 13 is supported for rotation within housing 11 along horizontal axis X by bearings (not shown). Hub 24, armature plate 26 and clutch rotor 15 rotate about axis X.

Clutch rotor 15 is made of a magnetic material, such as steel, and comprises an outer annular cylindrical portion 151, an inner annular cylindrical portion 152 and an axial end plate portion 153 which connects outer and inner annular cylindrical portions 151 and 152 at their forward ends. Thus, an annular U-shaped cavity 17 is defined by cylindrical portion 151, 152, and 153. A plurality of V-shaped grooves 18 are provided on the outer peripheral surface of outer annular cylindrical portion 151 for receiving belt (not shown) to couple rotor 15 to the output of the automobile engine (not shown). Rotor 15 is rotatably supported on tubular extension 12 of compressor housing 11 by bearing 16.

Axial end plate portion 153 includes one or more concentric slits 19 which are disposed on one or more concentric circles. These slits 19 define a plurality of annular or arcuate magnetic poles on the axial end plate portion 153.

Electromagnetic coil 20 is disposed in annular cavity 17 of clutch rotor 15. Electromagnetic coil supplies a magnetic flux (not shown) which attracts armature plate 26 to axial end plate portion 153 of rotor 15. Coil 20 is contained within annular magnetic housing 21. Housing 21 has a U-shaped cross section and is fixed to supporting plate 22, which is secured to the axial end surface of housing 11 by a plurality of rivets 221. A small air gap is maintained between magnetic housing 21 and clutch rotor 15.

Hub 24 comprises tubular member 241 which is secured tightly on the terminal end portion of drive shaft 13 by forcible insertion. Flange portion 242 extends radially from the front end of tubular member 241 and may be integrally formed with tubular member 241 or formed separately and affixed by a known securing method, such as welding. Relative rotation between hub 24 and drive shaft 13 is prevented by a key-keyhole mechanism 131 provided at the terminal end portion of drive shaft 13. Hub 24 is further secured to the terminal end portion of drive shaft 13 by nut 25 which is threaded on the terminal end of drive shaft 13. Annular shim 132 is disposed between a rearward end of tubular member 241 of hub 24 and annular ridge 132a. Ridge 132a is formed on the outer peripheral surface of the terminal end portion of drive shaft 13. The shim and ridge arrangement allows for the adjustment of air gap "1" between annular armature plate 26 and axial end plate portion 153 of rotor 15.

Armature plate 26, which is made of magnetic material, is concentric with hub 24, and has friction surface 26a which faces friction surface 153a of axial end plate portion 153 of rotor 15. Armature plate 26 has a plurality of elongated apertures 261 disposed along a circle, and is coupled to flange portion 242 of hub 24 by a plurality of leaf springs 27. Each leaf spring 27 is fixed at one end to armature plate 26 by rivet 31, and at the other end to the rearward surface of stopper plate 28. Stopper plate 28 is secured to flange portion 242 by rivets 29. Spacing member 30 and leaf spring 27 are positioned between stopper plate 28 and flange portion 242. By this arrangement, armature plate 26 may move relative to hub 24 along axis X upon the deflection of leaf springs 27.

A plurality of damper assemblies 33 are disposed between armature plate 26 and stopper plate 28. Each damper assembly 33 includes pin member 34 having flange portion 34a and shaft portion 34b. Shaft portion 34b axially penetrates annular elastic member 35, which is made of a synthetic rubber or a natural rubber or vibroisolating rubber. Elastic member 35 has one end bearing against flange portion 34a and another end bearing against armature plate 26. Pin member 34 is caulked at its reward end so as to slightly compress elastic member 35. Caulked portion 34c at the rearward end of shaft portion 34a of pin member 34 is disposed within cylindrical cavity 26b formed in friction surface 26a of armature plate 26.

When electromagnetic coil 20 is energized, magnetic flux is produced by electromagnet 21. Armature plate 26 is thus attracted to frictional surface 153a against the recoil strength of leaf springs 27. Rotational force from the automobile engine is then transmitted to armature plate 26 through rotor 15, and armature plate 26 rotates with rotor 15. Rotational force between armature plate 26 and rotor 15 is transferred by leaf spring 27.

In general, when armature plate 26 is attracted to rotor 15, rotor 15 is rotating at a relatively high speed in accordance with the rotation of the engine via the V-belt. In this situation, elastic member 35, which is positioned in hole 28a of stopper plate 28, moves in the rotational direction of drive shaft 13. As best seen in FIG. 3, the front side of elastic member 35 is compressed and the rear side of elastic member 35 expands in the rotational direction of armature plate 26. Such repeated application of force tends to crack elastic member 35 along the peripheral surface of pin member 34.

Further, impact force and vibration are usually produced when armature plate 26 is attracted to frictional surface 153a of rotor 15. The impact force and vibration is generally absorbed by deforming elastic member 35 so that the axial end portion thereof is compressed as shown in FIG. 4. The repeated compressive forces tend to deteriorate the absorptive ability of elastic member 35.

Furthermore, after armature plate 26 is attracted to rotor 15, the centrifugal force of drive shaft 13 causes elastic member 35 to move away from the center of drive shaft 13. The frictional contact between stopper plate 28 and elastic member 35 is increased due to the centrifugal force. According to these collective forces, elastic member 35 is forced toward the outer radial direction of contact with stopper plate 28, while being forced from hole 28a. The forces tend to create stress concentrations in the corner portions of elastic member 35, causing elastic member 35 to crack and sometimes even move out of hole 28a of stopper plate 28.

SUMMARY OF THE INVENTION

It is an object of this invention to prevent the destruction of a connecting and absorbing device caused by the attraction force and vibration when an electromagnetic clutch assembly is coupled to a refrigerant compressor.

It is another object of this invention to provide an electromagnetic clutch which is durable and reliable.

According to the present invention, an electromagnetic clutch includes a first rotatable member connected to an external driving source. The first rotatable member is rotatably supported on a first bearing and has an axial magnetic end plate. A second rotatable member is connected to a driven member. An annular magnetic member is connected to a driven member. The annular magnetic member is connected to the second rotatable member through a plurality of leaf springs so as to be capable of limited axial movement. The annular magnetic member faces the axial end plate of the first rotatable member with an axial gap therebetween. A third rotatable member is connected to the second rotatable member to limit the axial movement of the annular magnetic member.

An electromagnetic device couples the first rotatable member with the annular magnetic member and transmits a rotational force from an external driving source to the other rotatable members. A plurality of connecting and absorbing devices are fixedly disposed between the annular magnetic member and the third rotatable member. These devices connect the annular magnetic member to the third rotatable member and absorb vibration and impact when the annular magnetic member is attracted to the magnetic end plate of the first rotatable member. A further device is provided to prevent the deterioration and destruction of the absorbing device due to impact force and vibration.

Further objects, features and other aspects of this invention will be understood from the following detailed description of the preferred embodiments referring to the annexed drawings.

DETAILED DESCRIPTION OF THE PREFERRED EMBODIMENTS

FIGS. 5–20 depict an electromagnetic clutch according to the present invention. The clutch is similar to the electromagnetic clutch shown in FIGS. 14 except for the construction of the damper assembly. Therefore, similar parts are represented by the same reference numbers and detailed description of these parts is omitted.

Figure 1:
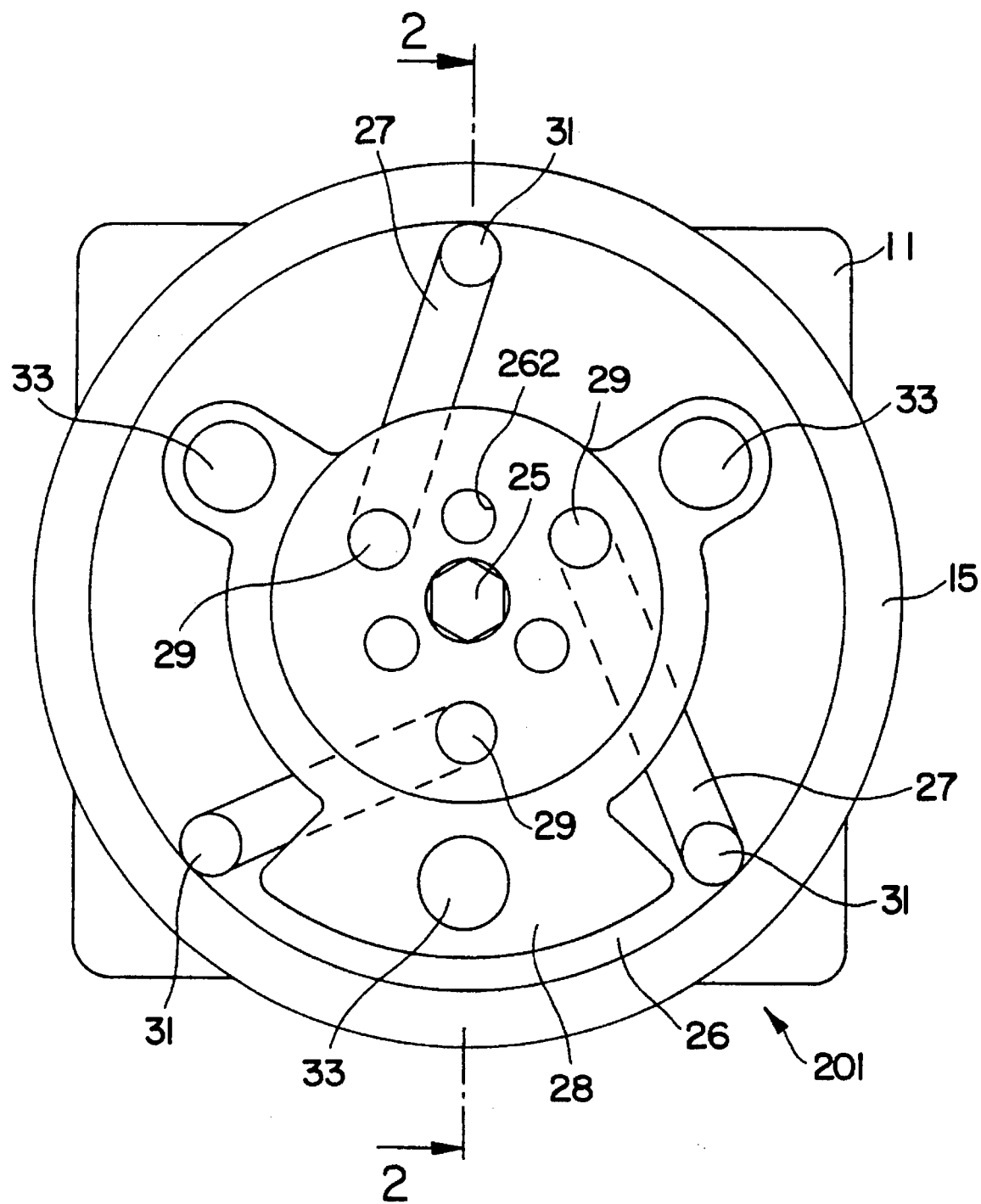
FIG. 1 is a side view of an electromagnetic clutch in accordance with the prior art.
Figure 2:
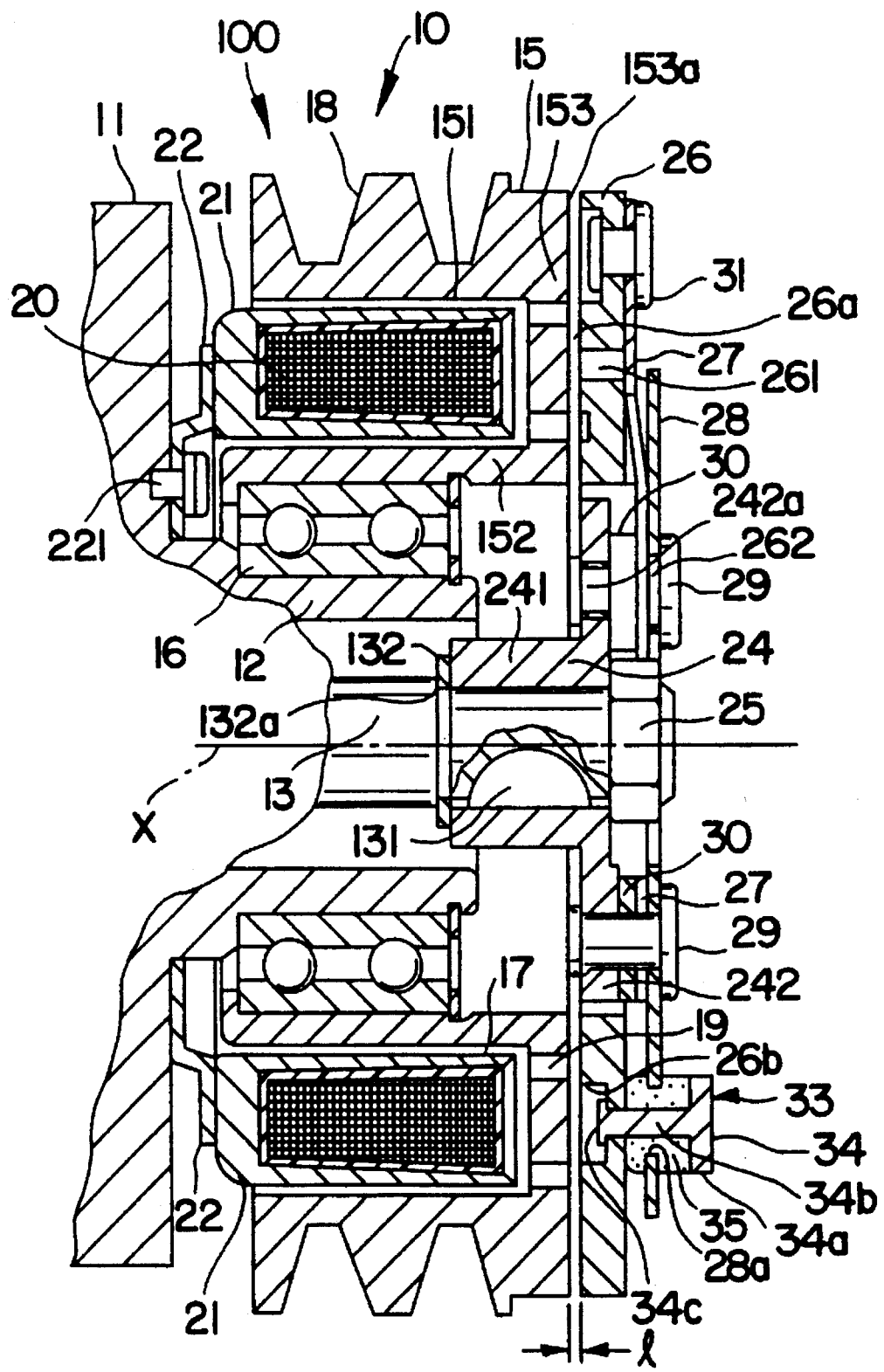
FIG. 2 is a vertical sectional view taken along line 2—2 of FIG. 1.
Figure 3:
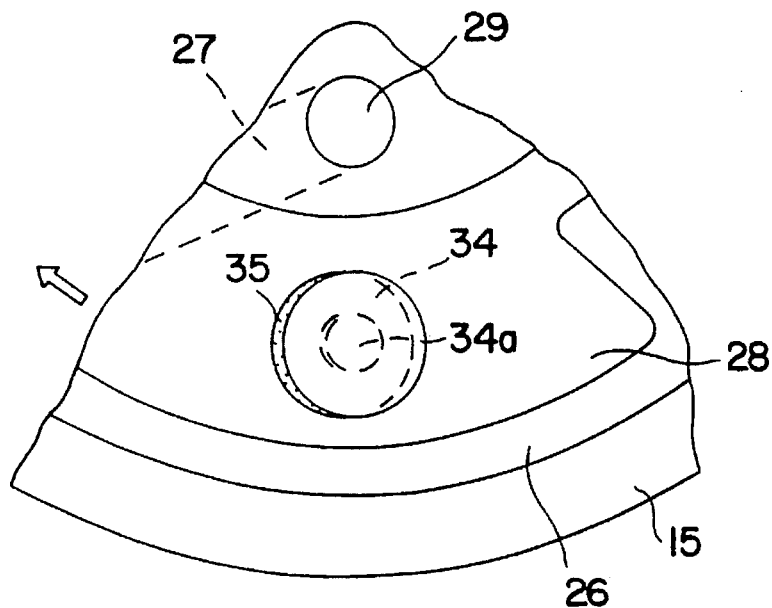
FIG. 3 is an enlarged fragmentary sectional view of an electromagnetic clutch shown in FIG. 1.
Figure 4:
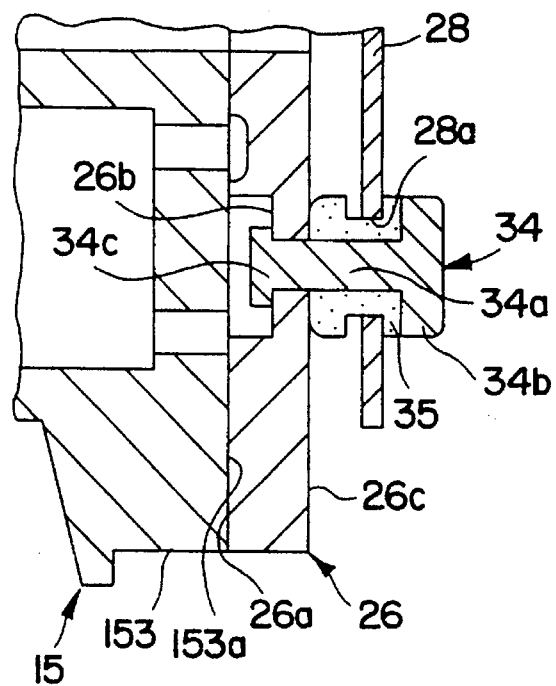
FIG. 4 is an enlarged fragmentary sectional view of an electromagnetic clutch shown in FIG. 2.
Figure 5:
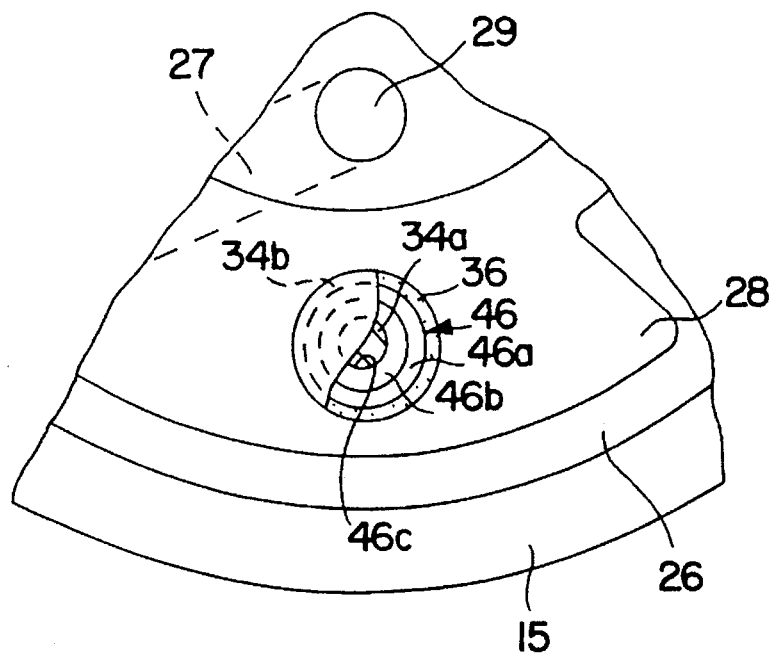
FIG. 5 is an enlarged fragmentary side view of an electromagnetic clutch in accordance with a first preferred embodiment.
Figure 6:
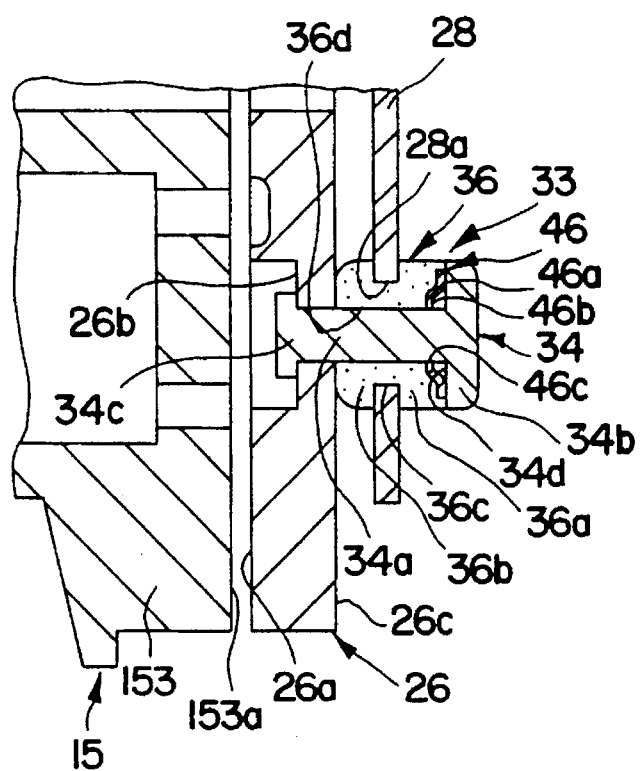
FIG. 6 is an enlarged fragmentary sectional view of an electromagnetic clutch in accordance with the first preferred embodiment.

FIGS. 5 and 6 illustrate a first preferred embodiment. Elastic member 36 is disposed between flange portion 34b of pin member 34 and outer end surface 26c of armature plate 26. Shaft portion 34a of pin member 34 is inserted into elastic member 36. Elastic member 36 includes cylindrical portion 36a having an opening at one end thereof and a jaw portion 36b having an opening at the other end thereof. Annular groove 36c is formed between cylindrical portion 36a and jaw portion 36b, and hole 36d is formed through the axial center of cylindrical portion 36a and jaw portion 36b. Further, elastic member 36 includes protection member 46, which is shaped as an annular ring and made of metal, such as stainless steel or steel or brass, or engineering plastic. Protection member 46 has first annular flange portion 46a and second annular portion 46b offset from first annular portion 46a. First and second portions 46a, 46b collectively act to prevent the deformation of elastic member 36. Protection member 46 is positioned by vulcanized press treatment in the axial end surface of elastic member 36 so that first annular flange portion 46a contacts inner surface 34d of flange portion 34b of pin member 34.

In this arrangement, when electromagnetic coil 20 is energized, the resulting magnetic flux attracts armature plate 26 to axial end plate portion 153 of rotor 15. Flange portion 34b of pin member 34 compresses and deforms elastic member 36 in the direction that armature plate 26 is attracted to rotor 15. Rotational force of rotor 15 is then transferred to drive shaft 13.

The impact force and axial vibration caused by the attraction of armature plate 26 to frictional surface 153a of rotor 15 is absorbed by the axial deformation and compression of elastic member 36. The torsional vibration sustained by armature plate 26 when attracted to rotor 15 is also absorbed through the deformation and compression of elastic member 36 in the rotational direction of drive shaft 13.

Conversely, when coil 20 is not energized, armature plate 26 is biased away from axial end plate portion 153 of rotor 15 by the resilience of elastic member 36 which acts to maintain a small gap "1" between armature plate 26 and axial end plate portion 153. The impact force and vibration caused by armature 26 striking against stopper plate 28 upon deenergizing coil 20 is absorbed by the deformation and compression of jaw portion 36b of elastic member 36.

Protection member 46 prevents elastic member 36 from being subjected to excessive attraction forces caused when armature plate 26 is attracted to rotor 15. As a result, protection member 46 prevents stress concentrations from occurring in the corner portion of elastic member 36, and prevents elastic member 36 from cracking and falling out of hole 28a of stopper plate 28.

Figure 7:
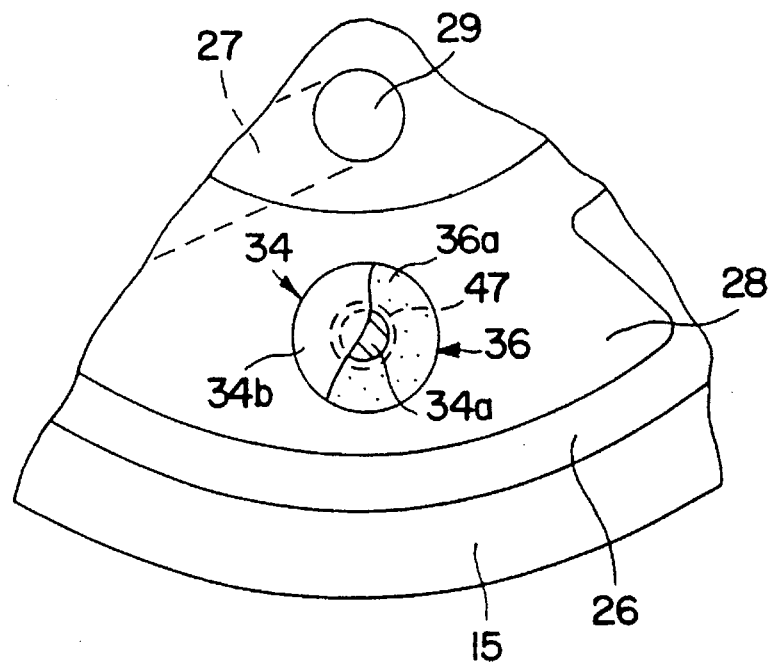
FIG. 7 is an enlarged fragmentary side view of an electromagnetic clutch in accordance with second preferred embodiment.
Figure 8:
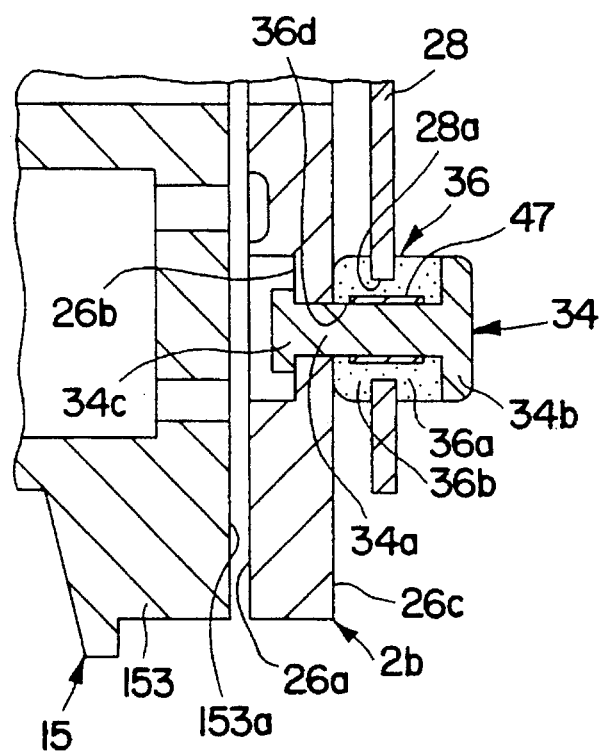
FIG. 8 is an enlarged fragmentary sectional view of an electromagnetic clutch in accordance with the second preferred embodiment.

FIGS. 7 and 8 illustrates a second preferred embodiment. Elastic member 36 includes protection member 47 which is shaped as a cylinder having openings at both ends thereof. Protection member 47 is preferably made of the same material as the first embodiment. Protection member 47 is inserted by vulcanized press treatment into the center of the axial surface of hole 36d of elastic member 36. Protection member 47 has an inner diameter substantially the same size as the outer diameter of shaft portion 34a of pin member 34. In addition, protection member 47 has an axial length shorter than that of elastic member 36.

Protection member 47 prevents elastic member 36 from being subjected to excessive centrifugal force during the rotation of nature plate 26. In addition, protection member 47 reduces the impact to elastic member 36 when armature plate 26 is attracted to rotor 15. As a result, stress concentrations in the corner portion of elastic member 36 are prevented, and elastic member 36 is prevented from cracking and falling out of hole 28a of stopper plate 28.

Figure 9:
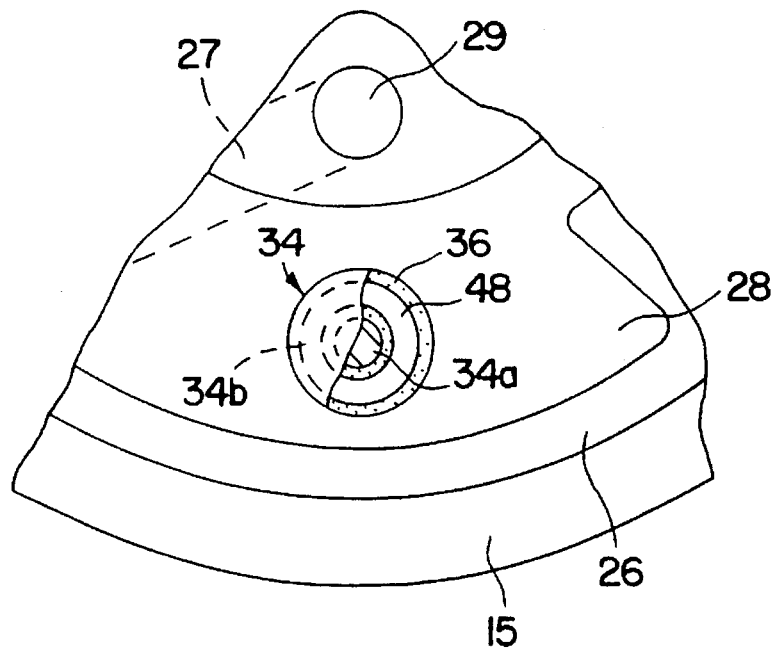
FIG. 9 is an enlarged fragmentary side view of an electromagnetic clutch in accordance with a third preferred embodiment.
Figure 10:
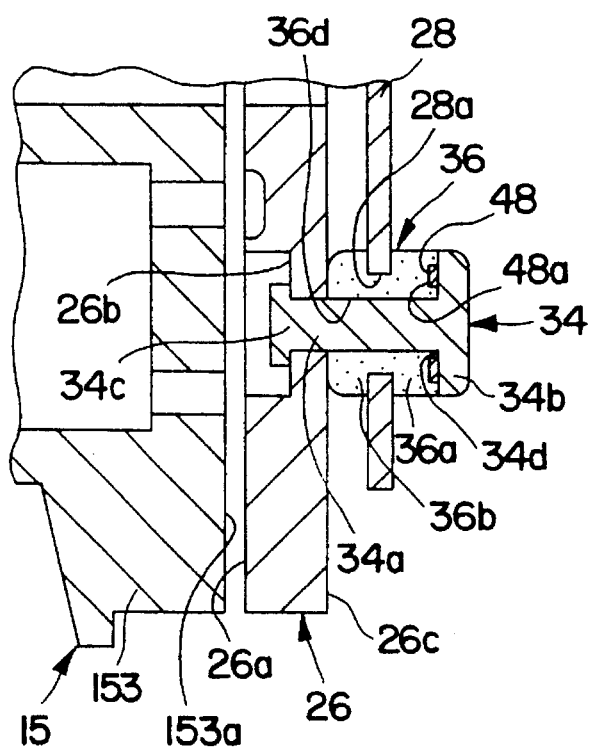
FIG. 10 is an enlarged fragmentary sectional view of an electromagnetic clutch in accordance with the third preferred embodiment.

FIGS. 9 and 10 illustrates a third preferred embodiment. In this embodiment, elastic member 36 includes protection member 48, which is shaped as an annular ring and has hole 48a in the center thereof. Protection member 48 is placed by vulcanized press treatment in the axial end surface of cylindrical portion 36a of elastic member 36 so that the axial end surface of protection member 48 contacts axial inner surface 34d of flange portion 34b of pin member 34. Hole 48a of protection member 48 is concentric with shaft portion 34a of pin member 34.

Figure 11:
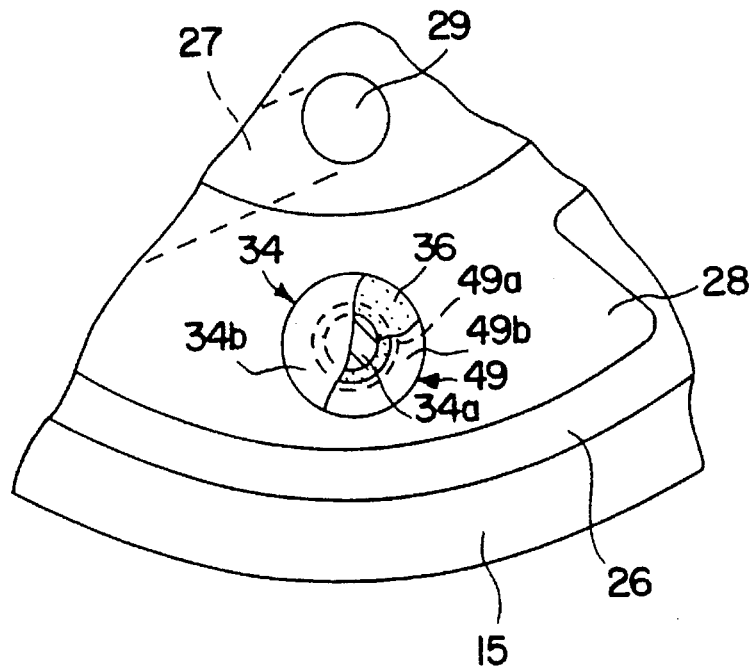
FIG. 11 is an enlarged fragmentary side view of an electromagnetic clutch in accordance with a fourth preferred embodiment.
Figure 12:
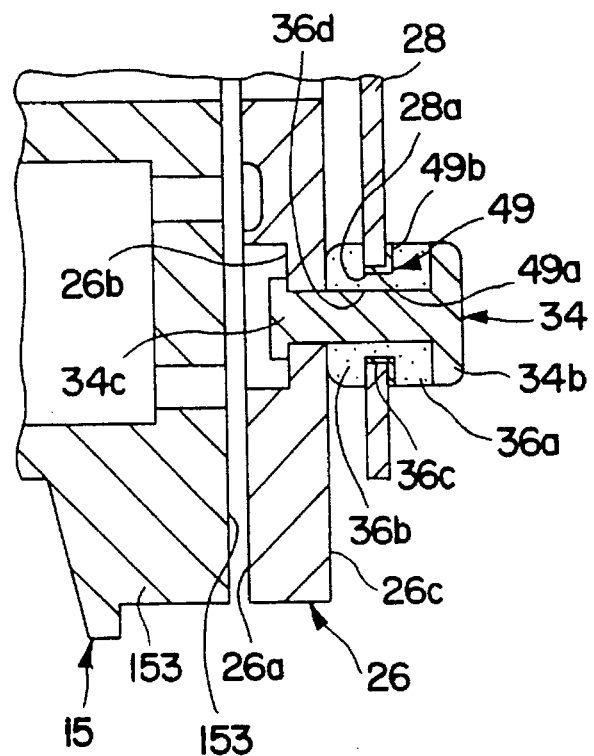
FIG. 12 is an enlarged fragmentary sectional view of an electromagnetic clutch in accordance with the fourth preferred embodiment.

FIGS. 11 and 12 illustrate a fourth preferred embodiment. In this embodiment, elastic member 36 includes protection member 49, which is shaped as an annular ring and has cylindrical portion 49a and flange portion 49b extending from cylindrical portion 49a. Protection member 49 is placed by vulcanized press treatment in groove 36c of elastic member 36. The axial end and outer radial surface of protection member 49 are positioned within the circumference of hole 28a of stopper plate 28. Flange portion 49b of protection member 49 faces flange portion 34b of pin member 34. Stress concentrations are reduced and the impact forces normally absorbed by the elastic member 36 are attenuated by protection member 49.

Figure 13:
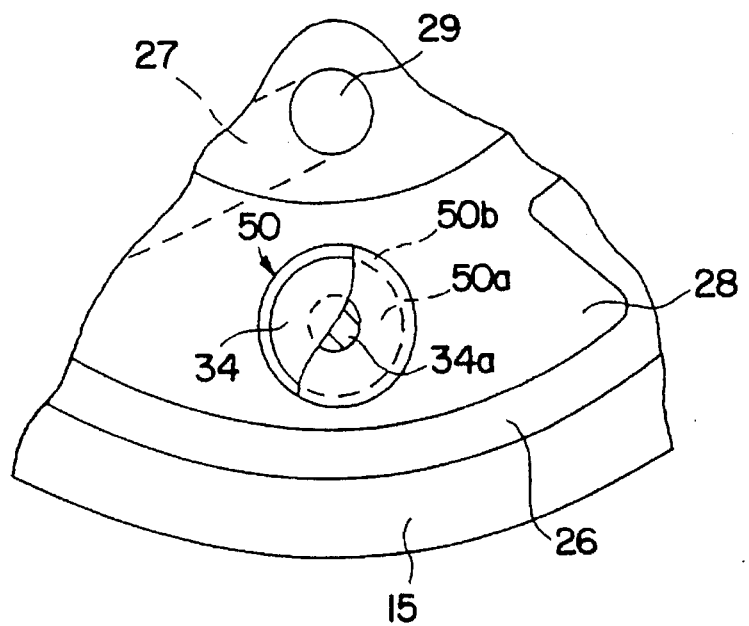
FIG. 13 is an enlarged fragmentary side view of an electromagnetic clutch in accordance with a fifth preferred embodiment.
Figure 14:
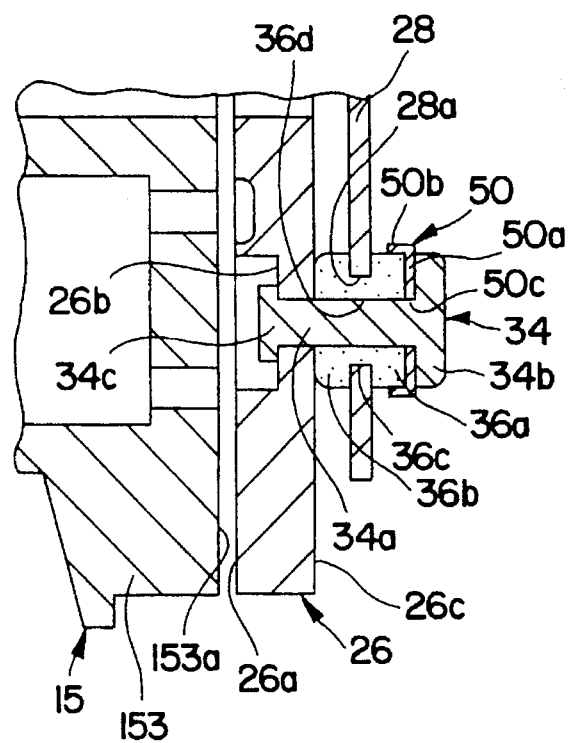
FIG. 14 is an enlarged fragmentary sectional view of an electromagnetic clutch in accordance with the fifth preferred embodiment.

FIGS. 13 and 14 illustrate a fifth preferred embodiment. In this embodiment, elastic member 36 includes protection member 50, which is shaped as annular ring and has first annular flange portion 50a, second annular flange portion 50b axially extending from first annular flange portion 50a and hole 50c in the center of first annular flange portion 50a. Protection member 50 is placed by vulcanized press treatment in the axial end surface of cylindrical portion 36a of elastic member 36. Shaft portion 34a of pin member 34 is inserted into hole 50c. First annular flange portion 50a contacts the inner surface of flange portion 34b of pin member 34. Second annular flange portion 50b restrains the radial expansion of cylindrical portion 36a of elastic member 36.

Figure 15:
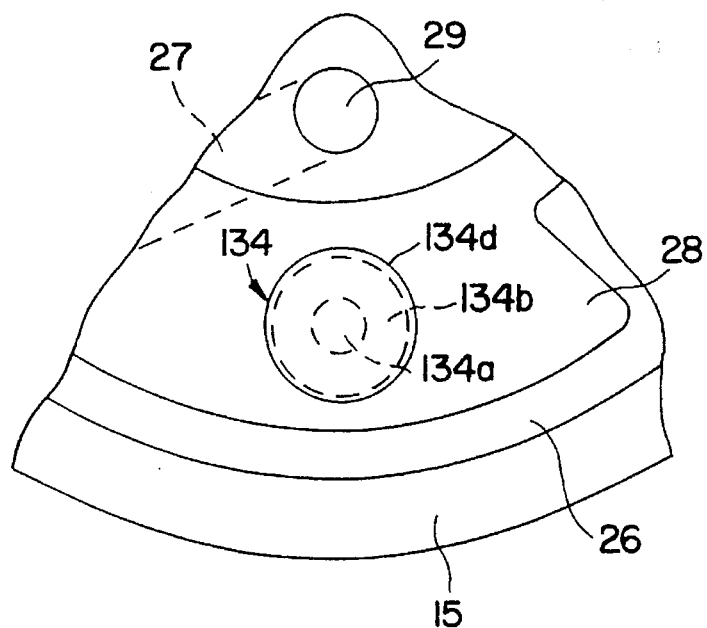
FIG. 15 is an enlarged fragmentary side view of an electromagnetic clutch in accordance with a sixth preferred embodiment.
Figure 16:
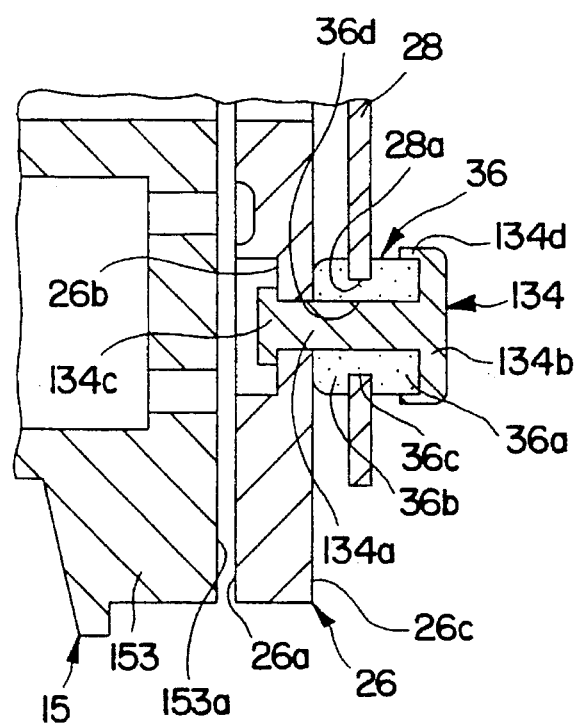
FIG. 16 is an enlarged fragmentary sectional view of an electromagnetic clutch in accordance with the sixth preferred embodiment.

FIGS. 15 and 16 illustrate a sixth preferred embodiment. In this embodiment, pin member 134 includes shaft portion 134a, first flange portion 134b radially extending from shaft portion 134a, and caulked portion 134c. Further, pin member 134 includes second flange portion 134d axially and circularly extending from first flange portion 134b along the circumference of cylindrical portion 36a of elastic member 36. Second annular flange portion 134d prevents cylindrical portion 36a of elastic member 36 from substantial radial expansion.

Figure 17:
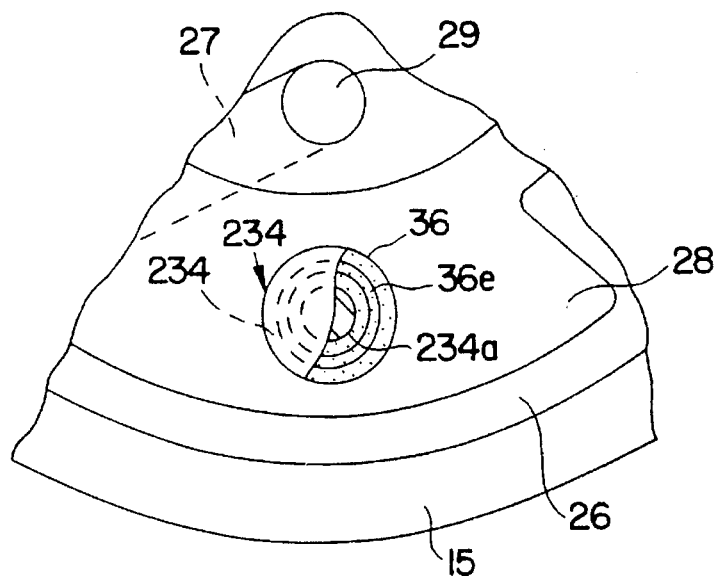
FIG. 17 is an enlarged fragmentary side view of an electromagnetic clutch in accordance with a seventh preferred embodiment.
Figure 18:
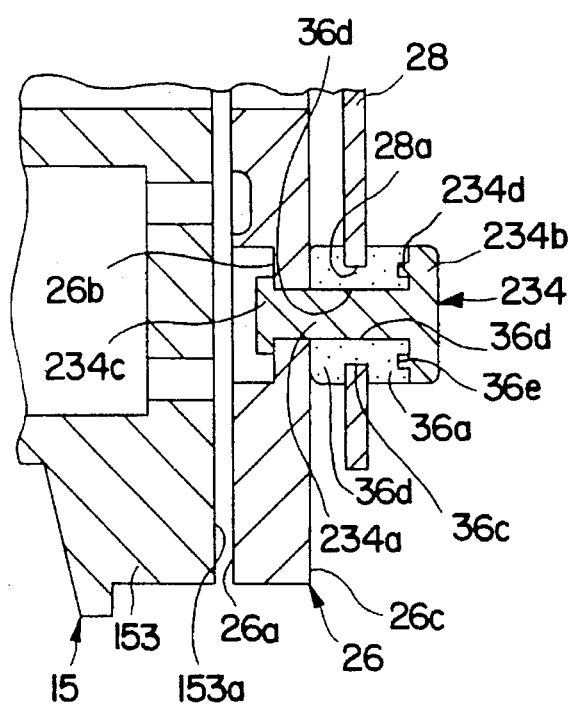
FIG. 18 is an enlarged fragmentary sectional view of an electromagnetic clutch in accordance with the seventh preferred embodiment.

FIGS. 17 and 18 illustrate a seventh preferred embodiment. In this embodiment, pin member 234 includes shaft portion 234a, flange portion 234b radially extending from shaft portion 234a and caulked portion 234c. Further, pin member includes projections 234d axially and circularly extending from flange portion 234b. Projections 234d are concentric with shaft portion 234a of pin member 234. Elastic member 36 includes grooves 36e formed concentric with hole 36d. Projections 234d engage grooves 36e of elastic member 36, substantially preventing the radial expansion of the elastic member 36 during operation of the electromagnetic clutch.

Figure 19:
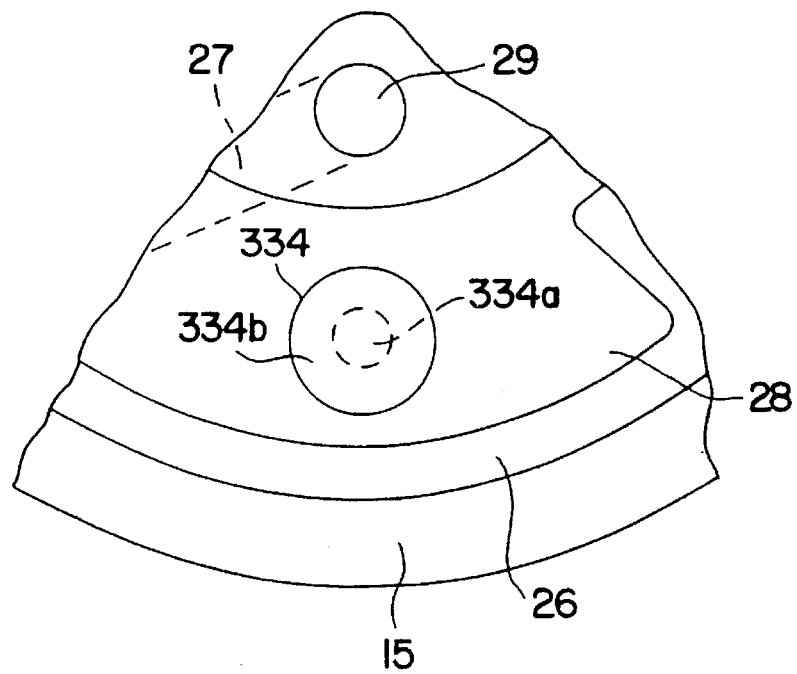
FIG. 19 is an enlarged fragmentary side view of an electromagnetic clutch in accordance with an eighth preferred embodiment.
Figure 20:
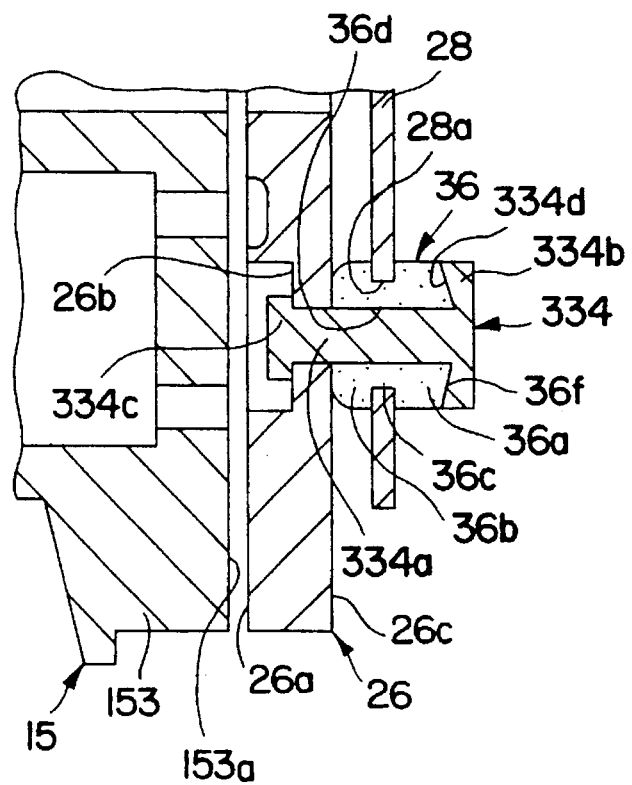
FIG. 20 is an enlarged fragmentary sectional view of an electromagnetic clutch in accordance with the eighth preferred embodiment.

FIGS. 19 and 20 illustrate an eighth preferred embodiment. In this embodiment, pin member 334 includes shaft portion 334a, flange portion 334b radially extending from shaft portion 334a and caulked portion 334c at the rearward end of shaft portion 334a. Further, flange portion 334b includes tapered surface 334d. Tapered surface 334d substantially prevents elastic member 36 from radially expanding. Elastic member 36 includes a tapered radial end surface 36f corresponding to taper surface 334d of pin member 334.

Each of the second through eighth preferred embodiments provides similar features and advantages as discussed with respect to the first preferred embodiment.

Although the present invention has been described in connection with the preferred embodiments, the invention is not limited thereto. It will be easily understood by those of ordinary skill in the art that variations and modifications can be easily made within the scope of this invention as defined by the appended claims.

We claim:

1. An electromagnetic clutch comprising:

a first rotatable member for connection to an external driving source, said first rotatable member rotatably supported on a first bearing and having an axial magnetic end plate;

a second rotatable member coupled to a driven member;

an annular magnetic member connected to said second rotatable member through a plurality of leaf springs so as to be capable of limited axial movement and facing said axial end plate of said first rotatable member with an axial gap therebetween;

a third rotatable member connected to said second rotatable member to limit axial movement of said annular magnetic member;

electromagnetic means coupled to said first rotatable member with said annular magnetic member and transmitting a rotational force from an external driving source to said second rotatable member;

a plurality of connecting and absorbing means fixedly disposed between said annular magnetic member and said third rotatable member for connecting said annular magnetic member to said third rotatable member and for absorbing vibration and impact force when said annular magnetic member is attracted to said magnetic end plate of said first rotatable member, said connecting and absorbing means comprising a pin member having a first end including a flange portion overlying an outer end surface of said third rotatable member, said connecting and absorbing means passing through an opening in said third rotatable member and fixedly secured to said annular magnetic member;

an elastic member sandwiched between said flange portion of said pin member and an outer end surface of said third rotatable member; and means for protecting said elastic member from deterioration by the impact force and vibration sustained when said annular magnetic member is attracted to said magnetic end plate;

wherein said protecting means is placed in said elastic member so as to contact said third rotatable member.

2. The electromagnetic clutch of claim 1 wherein said protecting means is an annular ring member.

3. The electromagnetic clutch of claim 2 wherein said annular ring member is metallic.

* * * * *